(12) United States Patent
Betran et al.

(10) Patent No.: US 10,628,335 B2
(45) Date of Patent: Apr. 21, 2020

(54) ACCESSING ORDERED SETS OF DATA ENTRIES

(71) Applicant: ARM Limited, Cambridge (GB)

(72) Inventors: Jaume Cabecerans Betran, Barcelona (ES); Eduard Vardanyan, Sheffield (GB)

(73) Assignee: ARM Limited, Cambridge (GB)

( * ) Notice: Subject to any disclaimer, the term of this patent is extended or adjusted under 35 U.S.C. 154(b) by 93 days.

(21) Appl. No.: 16/038,452

(22) Filed: Jul. 18, 2018

(65) Prior Publication Data

US 2019/0073321 A1    Mar. 7, 2019

(30) Foreign Application Priority Data

Sep. 6, 2017   (GB) .................................. 1714324.9

(51) Int. Cl.
*G06F 12/14* (2006.01)
*G06F 5/06* (2006.01)
*G06F 15/78* (2006.01)

(52) U.S. Cl.
CPC ............ *G06F 12/1483* (2013.01); *G06F 5/06* (2013.01); *G06F 15/7807* (2013.01)

(58) Field of Classification Search
None
See application file for complete search history.

(56) References Cited

U.S. PATENT DOCUMENTS

| | | | |
|---|---|---|---|
| 5,805,879 A | * | 9/1998 | Hervin ................ G06F 9/30101 712/227 |
| 7,620,693 B1 | | 11/2009 | Mott et al. |
| 2003/0018689 A1 | | 1/2003 | Ramakrishnan |
| 2007/0174513 A1 | | 7/2007 | Wrigley et al. |
| 2018/0246820 A1 | * | 8/2018 | Mirza ................ G06F 13/1642 |

OTHER PUBLICATIONS

Combined Search and Examination Report for GB1714324.9 dated Feb. 7, 2018, 6 pages.

* cited by examiner

*Primary Examiner* — Prasith Thammavong
*Assistant Examiner* — Edmund H Kwong
(74) *Attorney, Agent, or Firm* — Nixon & Vanderhye P.C.

(57) ABSTRACT

Processing circuitry 2 includes data storage circuitry 18 for storing one or more ordered sets of data entries. Access control circuitry 20 controls access during a given access cycle to a given ordered set of data entries in dependence upon, for that given set of data entries, a head-entry flag, a next-following-entry flag and preceding-cycle data. The head-entry flag indicates the oldest data entry for the given ordered set, the next-following-entry flag indicates the next oldest entry and the preceding-cycle flag indicates whether the given ordered set was accessed during a preceding access cycle. If the given ordered set was accessed during the preceding access cycle, then the next-following entry corresponding to the next-following flag is accessed during the current access cycle instead of that indicated by the head flag.

17 Claims, 22 Drawing Sheets

|   | ID | V | HF | NFF | PCF |
|---|---|---|---|---|---|
| A | 1 | 1 | 1 | 0 | 0 |
|   | 0 | 0 | 0 | 0 | 0 |
|   | 0 | 0 | 0 | 0 | 0 |
|   | 0 | 0 | 0 | 0 | 0 |

PUSH ID 1

|   | ID | V | HF | NFF | PCF |
|---|---|---|---|---|---|
| B | 1 | 1 | 1 | 0 | 0 |
|   | 1 | 1 | 0 | 1 | 0 |
|   | 0 | 0 | 0 | 0 | 0 |
|   | 0 | 0 | 0 | 0 | 0 |

POP ID 1

|   | ID | V | HF | NFF | PCF |
|---|---|---|---|---|---|
| C | 1 | 0 | 1 | 0 | 1 |
|   | 1 | 1 | 0 | 1 | 1 |
|   | 0 | 0 | 0 | 0 | 0 |
|   | 0 | 0 | 0 | 0 | 0 |

PUSH ID 1 POP ID 1

|   | ID | V | HF | NFF | PCF |   |
|---|---|---|---|---|---|---|
| D | 1 | 1 | 0 | 1 | 0 |   |
|   | 1 | 0 | 1 | 0 | 1 | * |
|   | 0 | 0 | 0 | 0 | 0 |   |
|   | 0 | 0 | 0 | 0 | 0 |   |

| | FIG. 7A |
|---|---|
| | FIG. 7B |

CYCLE 0 — PUSH 1

| ID | HF1 | HF2 | VALID | MATRIX | MATRIX + PUSH |
|---|---|---|---|---|---|
| 1 | 1 | 0 | 1 | 1 | 1 |
| 2 | 1 | 0 | 1 | 1 | 1 |
| 3 | 1 | 0 | 1 | 1 | 1 |
| x | 0 | 0 | 0 | x | 2 |
| x | 0 | 0 | 0 | x | x |

CYCLE 1 — POP 2

| ID | HF1 | HF2 | VALID | MATRIX | MATRIX + PUSH |
|---|---|---|---|---|---|
| 1 | 1 | 0 | 1 | 1 | 1 |
| 2 | 1 | 0 | 1 | 1 | 1 |
| 3 | 1 | 1 | 1 | 1 | 1 |
| 1 | 0 | 0 | 0 | 2 | 2 |
| x | 0 | 0 | 0 | x | x |

CYCLE 2 — PUSH 3 POP 1

| ID | HF1 | HF2 | VALID | MATRIX | MATRIX + PUSH |
|---|---|---|---|---|---|
| 1 | 1 | 0 | 1 | 1 | 1 |
| 2 | 1 | 0 | 0 | x | x |
| 3 | 1 | 1 | 1 | 1 | 1 |
| 1 | 0 | 0 | 0 | 2 | 2 |
| x | 0 | 0 | 0 | x | 2 |

FIG. 7A

CYCLE 3

| 1 | 1 | 0 | 0 | 1 | 1 |
|---|---|---|---|---|---|
| x | 0 | 0 | 0 | x | x |
| 3 | 1 | 1 | 0 | 1 | 1 |
| 1 | 0 | 1 | 1 | 2 | 2 |
| 3 | 0 | 1 | 1 | 2 | 2 |

| | | | | | |
|---|---|---|---|---|---|
| | | | | | |
| | | | | | |
| | | | | | |
| | | | | | |

I am in cycle 2 and want to calculate HF1 and HF2 for cycle 3

I know that from cycle to cycle, only the headflags related to 2 specific IDs have changed, the rest of the headflags REMAIN THE SAME !

CHANGE 1: PUSH ID CURRENT CYCLE
CHANGE 2: POP ID LAST CYCLE

As you can see, the only difference in the headflags from cycle 2 to cycle 3 is in the IDs 3 (current push) and 2 (last pop)
Any other things (PUSH last cycle or POP current cycle) have no effect on the difference in the headflags between cycle 2 and 3

Which means, I only need to do 2 lookups for 2 IDs to 100% update the HF1-2 from one cycle to another The changes to HFs from N to N+1 are because of POP(N-1) and PUSH(N)

| T (Cycles) | ID (reg) | HF1 (reg) | HF2 (reg) | VALID (reg) | MATRIX (reg) | MATRIX + PUSH (combo) | IDPLC | LPOP_ID |
|---|---|---|---|---|---|---|---|---|
| 1:PUSH1 | | X | 0 | 0 | 0 | 1 | | |
| | | X | 0 | 0 | 0 | X | | |
| | | X | 0 | 0 | 0 | X | | |
| | | X | 0 | 0 | 0 | X | | | set_headflaf = (~id_match & push) | (id_match & pop_valid & hf2) | (only one left which is going out and smae id is coming)

set_headflaf = (fresh_id_coming) | (headflag linking to this entry has left)

HF1 = id_match(current_push_id) ? matrix_look_up_oldest(current_push_id) : (id_match(last_pop_id) ? matrix_lookup_oldest(last_pop_id) : HF1)

HF2 = id_match(current_push_id) ? HF2 : (id_match(last_pop_id) ? matrix_lookup_second_oldest(last_pop_id) : HF2)

| FIG. 9A | FIG. 9E |
|---|---|
| FIG. 9B | FIG. 9F |
| FIG. 9C | |
| FIG. 9D | |

| | | 1 | 0 | 1 | 1 | 2 | 2 | |
|---|---|---|---|---|---|---|---|---|
| | X | 0 | 0 | 0 | X | X | X | |
| | X | 0 | 0 | 0 | X | X | X | |
| | X | 0 | 0 | 0 | X | X | X | |
| 8 IDLE | 1 | 1 | 0 | 1 | 1 | 1 | 1 | |

| | | 1 | 0 | 1 | 1 | 2 | 2 | |
|---|---|---|---|---|---|---|---|---|
| | X | 0 | 0 | 0 | X | X | X | |
| | X | 0 | 0 | 0 | X | X | X | |
| | X | 1 | 0 | 0 | X | X | X | |
| 9 IDLE | 1 | 1 | 0 | 1 | 1 | 1 | 1 | |

The "MATRIX + PUSH" is here to help visualize. It is the registered matrix values + push info from current cycle.

This is ALL the information needed to calculate the HF1 and HF2 values.

Tracker with N entries

FIG. 9D

DISCUSSION ON UPDATING HFs

HF1_set = (~id_match & push) | (id_match & pop_valid & hf2_is_going_out)

if there is a push and no entry matches the push ID and I am the next entry to be allocated i should be hf1      if there was pop in t-1 and I am hf2 i should now be h1

HF1_set[n] = ( ~|id_match(current_push_id) & next_entry_to_be_allocated[n] & push_valid)        | (id_match(last_pop_id)[n] & hf2[n] & pop_valid(t-1) )

if I am hf1 and there was a pop for my id in t-1 i am no longer in the matrix and shouldn't be hf1

HF1_clear[n] = hf1[n] & ~hf2[n] & id_match(last_pop_id)[n] & pop_valid(t-1))        ~hf2[n] can be omitted if there is a push and there is no hf2 for my id and I am the next entry to be allocated, I should become hf2        if there was pop in t-1 and I am now the second oldest (in the matrix) then i should be hf2

HF2_set[n] = ( push_valid & ~|( hf2 & id_match(current_push_id) ) & next_entry_to_be_allocated )        | ( pop_valid(t-1) & id_match(last_pop_id)[n] & matrix_lookup_second_oldest(last_pop_id)[n] )

if I am hf2 and there was pop in t-1 then i should be moved to be hf1 and should no longer be h2

HF2_clear[n] = ~hf1[n] & hf2[n] & id_match(last_pop_id)[n] & pop_valid(t-1))        ~hf1[n] can be ommited If done naively, the updating of HF1 and HF2 could be very expensive in terms of logic The naive approach would consist of doing a lookup for every entry in the matrix to determine if their corresponding HFs values have changed.

This would require NUM_ENTRIES * 2 lookup logics ( HF1 and HF2 )

Upon close inspection it can be seen that in any given cycle, at most, 4 HF values will change It can also be seen that those changes can only be due to 2 operations:

The "MATRIX + PUSH" is here to help visualize. It is the registered matrix values + push info from current cycle.

This is ALL the information needed to calculate the HF1 and HF2 values.

DISCUSSION ON UPDATING HFs

If done naively, the updating of HF1 and HF2 could be very expensive in terms of logic The naive approach would consist of doing a lookup for every entry in the matrix to determine if their corresponding HFs values have changed.

This would require NUM_ENTRIES * 2 lookup logics ( HF1 and HF2 )

Upon close inspection it can be seen that in any given cycle, at most, 4 HF values will change It can also be seen that those changes can only be due to 2 operations:

1. PUSH from cycle T

2. POP from cycle T-1

This sets the amount of lookup logic needed to 4

1. Lookup to update HF1 for entries which ENTRY_ID = PUSH ID T

2. Lookup to update HF1 for entries which ENTRY_ID = POP ID T-1

3. Lookup to update HF2 for entries which ENTRY_ID = PUSH ID T

4. Lookup to update HF2 for entries which ENTRY_ID = POP ID T-1

FIG. 10D ated circuit in which multiple functional blocks commu-
ACCESSING ORDERED SETS OF DATA ENTRIES This application claims priority to GB Patent Application No. 1714324.9 filed Sep. 6, 2017, the entire contents of which are hereby incorporated by reference.

BACKGROUND

Technical Field

This disclosure relates to the field of data processing systems. More particularly, this disclosure relates to apparatus and methods for accessing ordered sets of data entries.

Technical Background

Within data processing systems, there exist various circumstances in which it is desirable to control access to ordered sets of data entries. One example circumstance is in the field of system-on-chip interconnect circuitry in which multiple transactions sharing a common identifier may be outstanding at any given time and when the responses to those transactions are received, they are matched against ordered sets of data entries tracking those transactions. In this example context, the ordered sets of data entries track all the transactions from a given functional block, or a given thread executing on a functional block, and within such sets of transactions match the received responses against the issuing requests using data stored within a first-in-first-out buffer.

Another example in which ordered sets of data entries within data storage circuitry may be tracked is a cache memory in which, for example, least-recently-used status of the entries is used to control cache eviction. Other examples of situations in which it is desired to store and control access to ordered sets of data entries are also possible.

A problem that can arise within systems controlling access to ordered sets of data entries is that the mechanisms controlling such accesses may constrain the speed with which the system operates. For example, within the field of system-on-chip integrated circuits the interconnect circuitry through which different portions of the system-on-chip integrated circuit communicate may limit the clock frequency used to regulate the system-on-chip integrated circuitry as a consequence of the need to manage access to ordered sets of data entries corresponding to outstanding transactions being communicated through the interconnect circuitry.

At least some example embodiments of the present disclosure provide apparatus for processing data comprising:
data storage circuitry to store one or more ordered sets of data entries;
access control circuitry to control access, during a given access cycle, to a given ordered set of data entries of said one or more ordered sets of data entries in dependence upon, for said given ordered set:
head-entry location data indicating a head storage location within said data storage circuitry storing a head entry of said given ordered set to be accessed next;
next-following-entry location data indicating a next-following storage location within said data storage circuitry storing a next-following entry of said given ordered set to be accessed next after said head storage location for said given ordered set; and
preceding-cycle data indicating whether said given ordered set was accessed during a preceding access cycle preceding said given access cycle; wherein
when said preceding-cycle data indicates that said given ordered set was accessed during said preceding access cycle, said access control circuitry uses said next-following-entry location data to access said next-following entry within said next-following storage location during said given access cycle.

At least some example embodiments of the present disclosure provide apparatus for processing data comprising:
data storage means for storing one or more ordered sets of data entries;
access control means for controlling access, during a given access cycle, to a given ordered set of data entries of said one or more ordered sets of data entries in dependence upon, for said given ordered set:
head-entry location data indicating a head storage location within said data storage means storing a head entry of said given ordered set to be accessed next;
next-following-entry location data indicating a next-following storage location within said data storage means storing a next-following entry of said given ordered set to be accessed next after said head storage location for said given ordered set; and
preceding-cycle data indicating whether said given ordered set was accessed during a preceding access cycle preceding said given access cycle; wherein
when said preceding-cycle data indicates that said given ordered set was accessed during said preceding access cycle, said access control means uses said next-following-entry location data to access said next-following entry within said next-following storage location during said given access cycle.

At least some example embodiments of the present disclosure provide a method of processing data comprising:
storing one or more ordered sets of data entries within data storage circuitry;
controlling access, during a given access cycle, to a given ordered set of data entries of said one or more ordered sets of data entries in dependence upon, for said given ordered set:
head-entry location data indicating a head storage location within said data storage circuitry storing a head entry of said given ordered set to be accessed next;
next-following-entry location data indicating a next-following storage location within said data storage circuitry storing a next-following entry of said given ordered set to be accessed next after said head storage location for said given ordered set; and
preceding-cycle data indicating whether said given ordered set was accessed during a preceding access cycle preceding said given access cycle; wherein
when said preceding-cycle data indicates that said given ordered set was accessed during said preceding access cycle, using said next-following-entry location data to access said next-following entry within said next-following storage location during said given access cycle.

Further aspects, features and advantages of the present technique will be apparent from the following description of examples, which is to be read in conjunction with the accompanying drawings.

BRIEF DESCRIPTION OF THE DRAWINGS

Figure 6B:
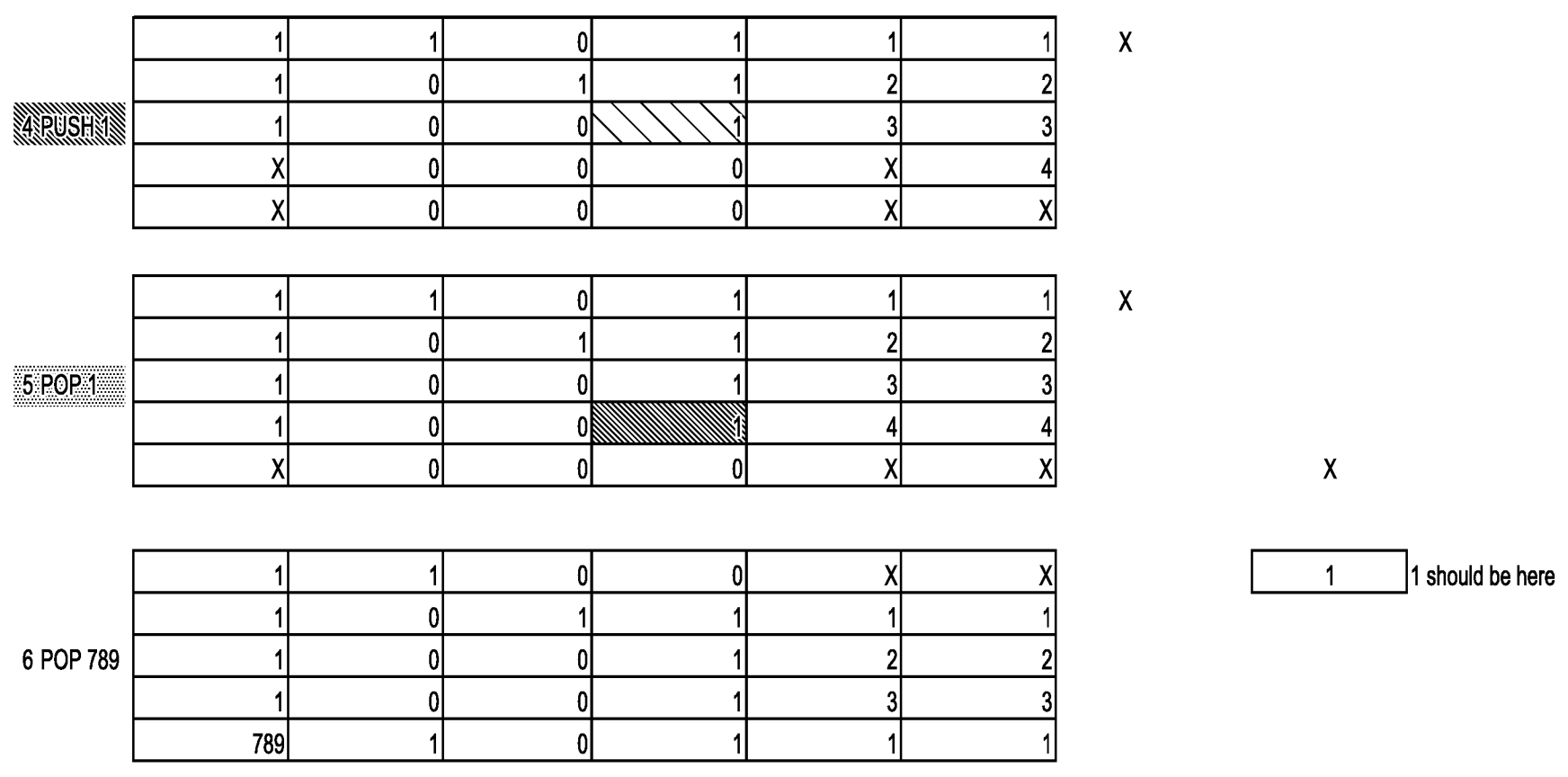
Figure 6C:
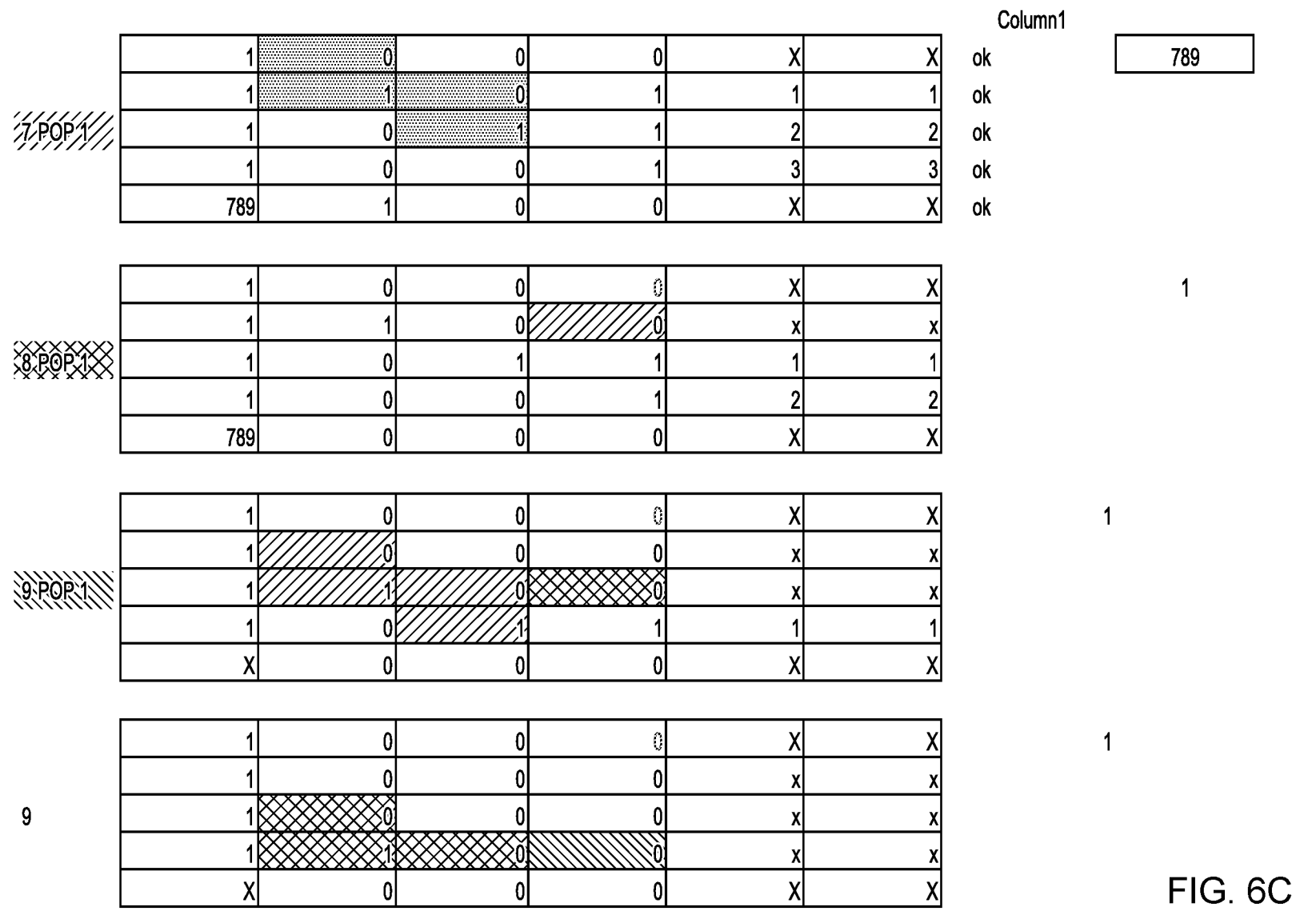
Figure 8A:
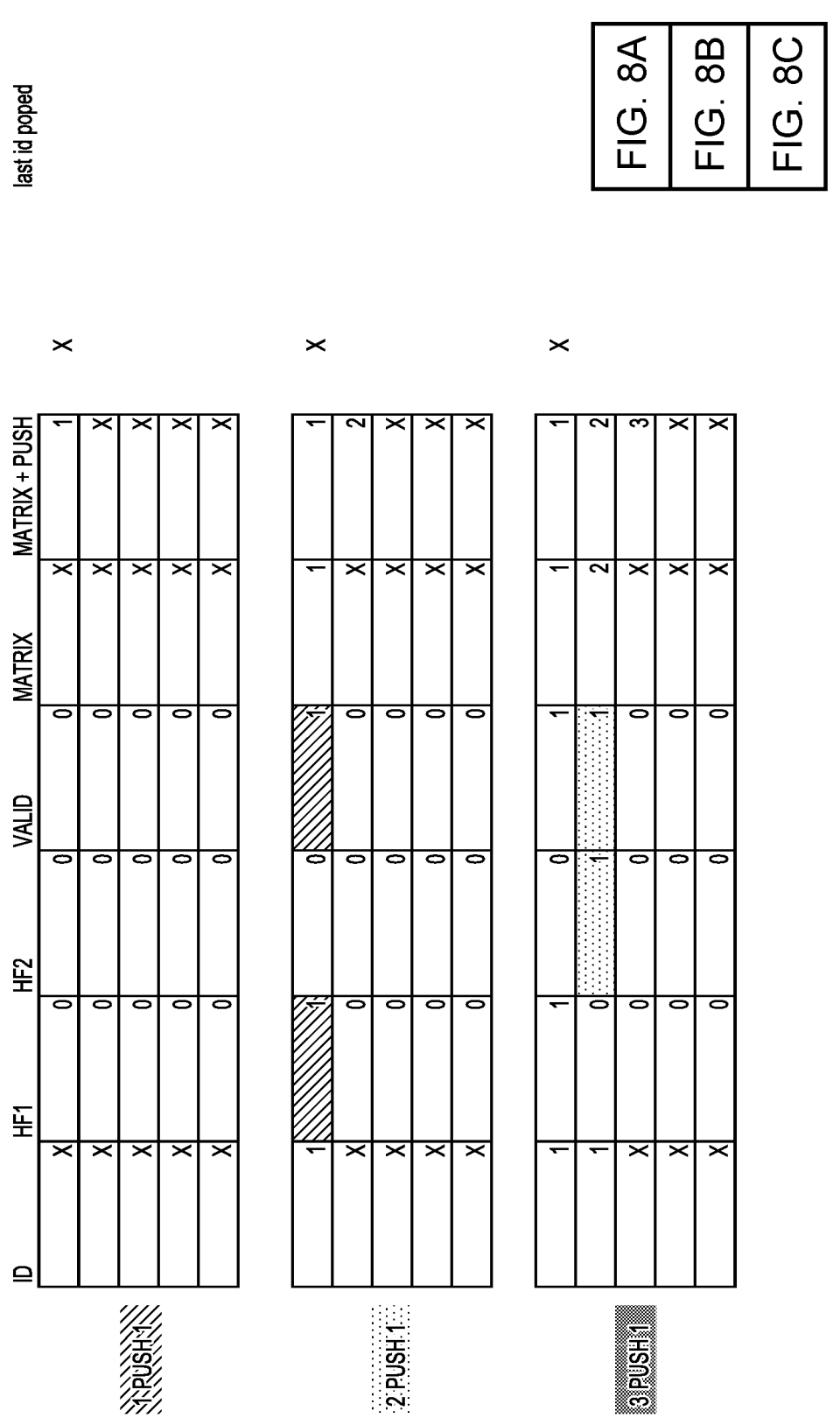
Figure 8B:
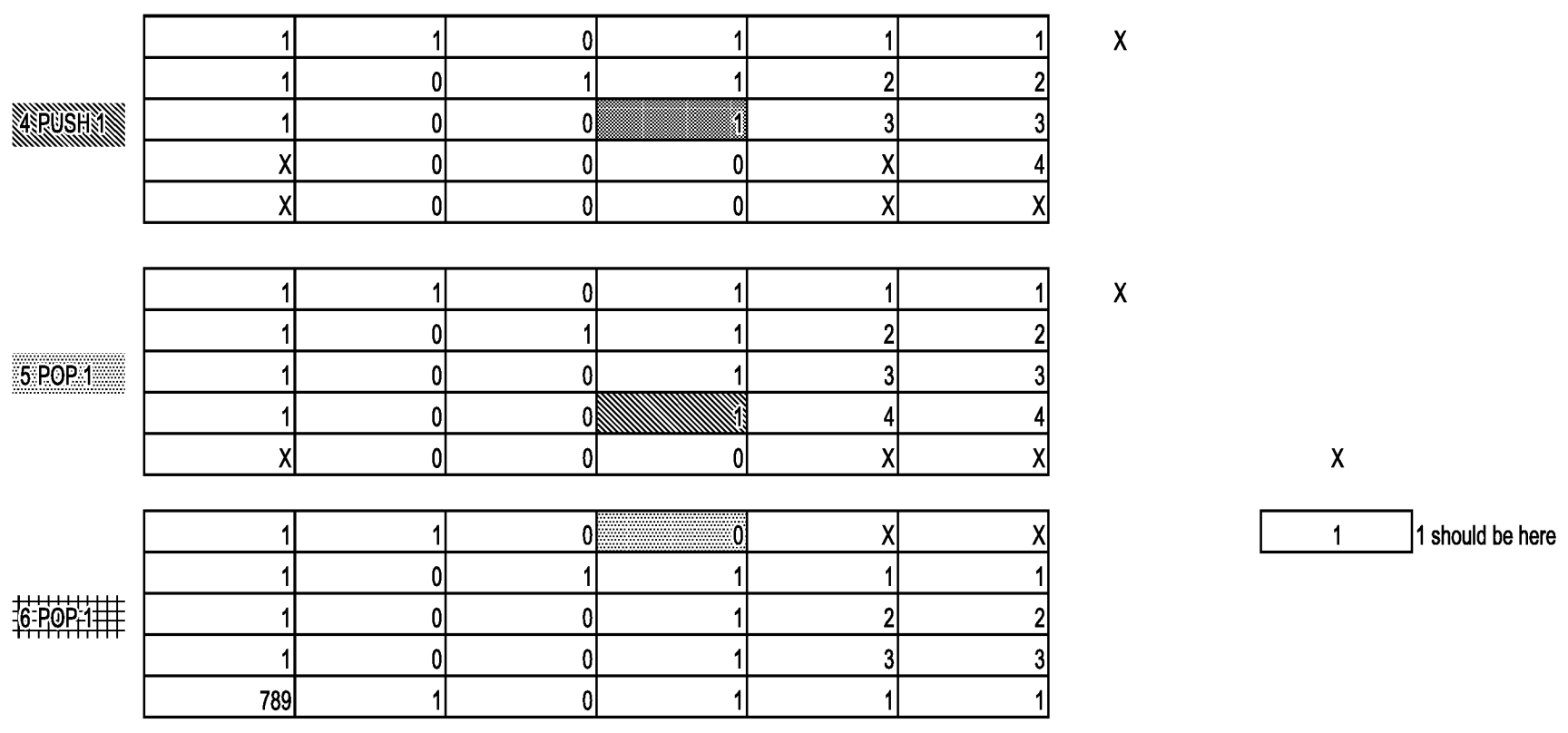
Figure 8C:
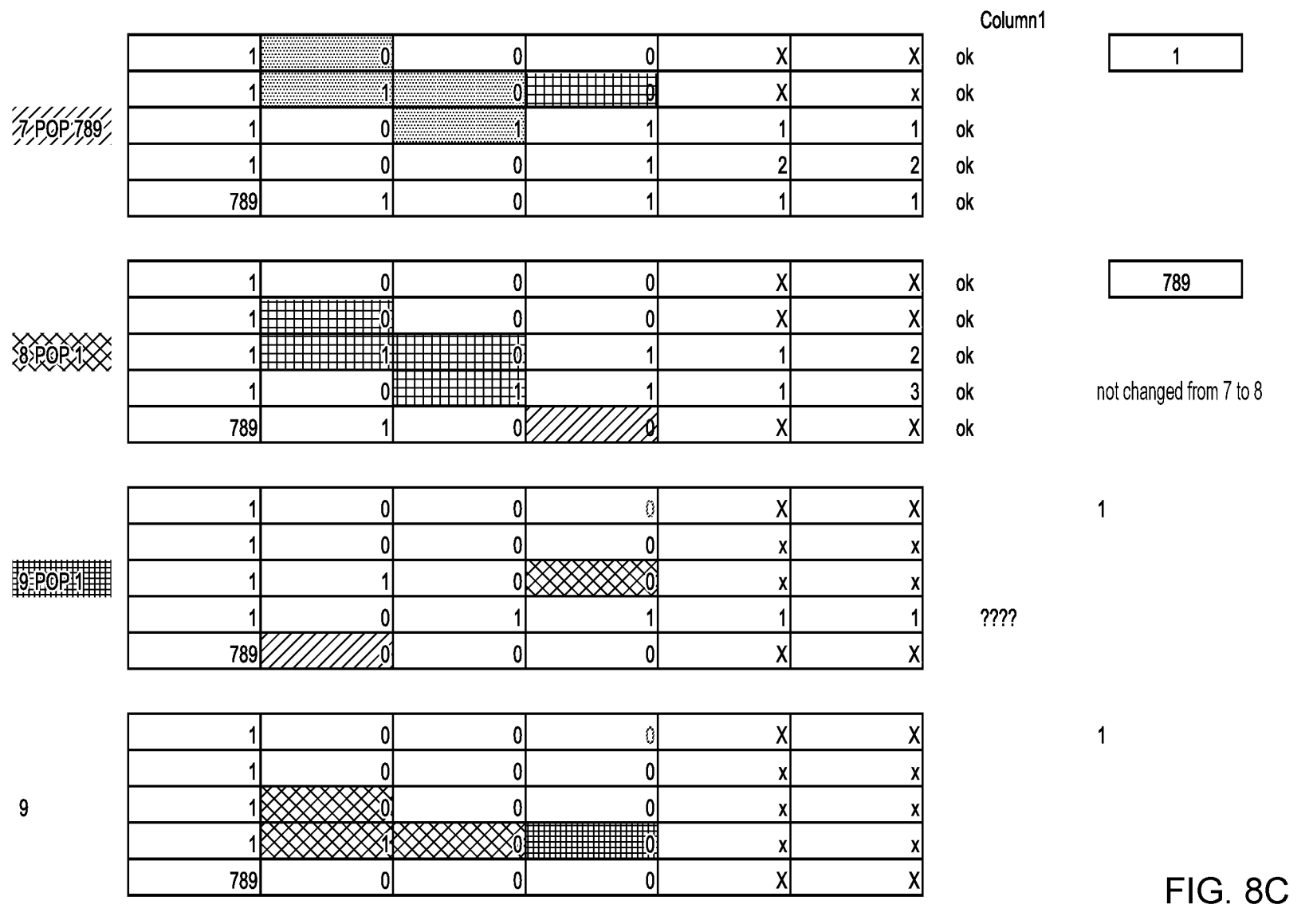
Figure 10C:
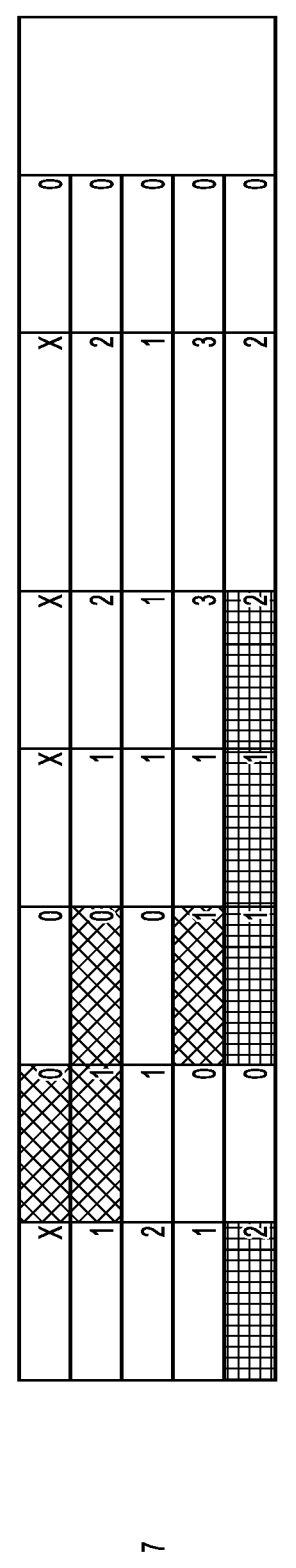

FIGS. 6A to 10D schematically illustrate operation of a further example embodiment of the present disclosure.

DESCRIPTION OF EXAMPLES

Figure 1:
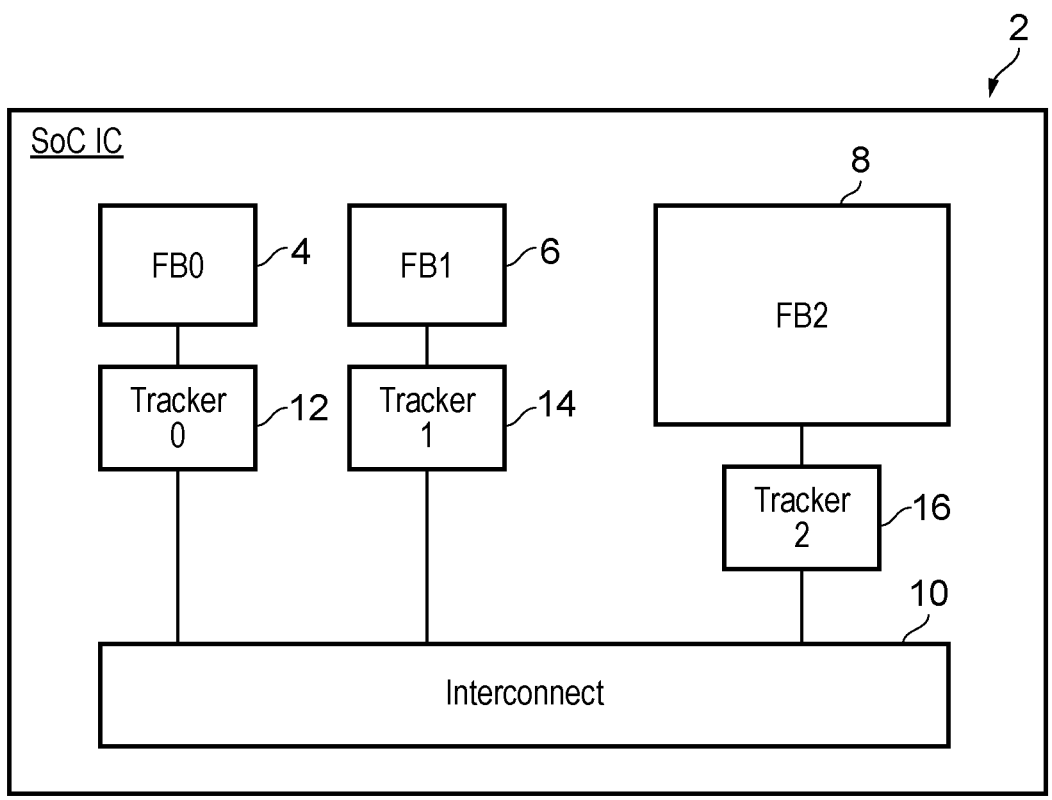
FIG. 1 schematically illustrates a system-on-chip integrated circuit in which multiple functional blocks communicate through interconnect circuitry.

FIG. 1 schematically illustrates a system-on-chip integrated circuit 2 which includes a plurality of functional blocks (of circuitry) 4, 6, 8 communicating via interconnect circuitry 10. Transaction tracking circuitry 12, 14, 16 disposed between each functional block 4, 6, 8 and the interconnect circuitry 10 serves to track outstanding transactions which have been issued to the interconnect circuitry 10 in order subsequently to match these with received transaction responses received from the interconnect circuitry 10. As an example, a functional block 4, 6, 8 could be executing multiple program threads and may associate different identifier values with transactions originating as a consequence of the execution of program instructions in the different program threads. Thus, the tracker circuitry 12, 14, 16 may store multiple ordered sets of data entries each ordered set corresponding a particular thread identifier and representing the outstanding transactions for that given thread identifier. When transaction responses are received from the interconnect circuitry 10, then these matched against the data entries representing outstanding transactions so that the responses can be appropriate processed. When the interconnect circuitry 10 does not re-order transactions, then the received transaction responses can be matched against the transaction identifiers stored to identify a corresponding ordered set of data entries representing the outstanding transactions for a given transaction identifier and so that the entries representing the outstanding transactions may be used in a first-in-first-out manner, i.e. the oldest (longest outstanding) data entry which matches the transaction identifier concerned is used to process a newly received transaction response.

In a given processing cycle (clock cycle), the tracker circuitry 14, 16, 18 may both receive a transaction response to be matched against stored data entries and issue a new transaction response which is to be stored as a new data entry. When a new data entry is being stored and an existing data entry is being read within the same processing cycle for the same ordered set of data entries, then speed constraining difficulties can arise in keeping track of the relative ordering of the data entries within the given ordered set of data entries matching the transaction identifier concerned. In particular, if a head flag is used to track which data entry for a given ordered set of data entries is currently the oldest (was the first in), then it can be difficult to both consume such a head flag when a data entry is being read from the data storage circuitry and generate an appropriate new flag for a new data entry that is being written to the data storage circuitry during the same processing cycle.

Figure 2:
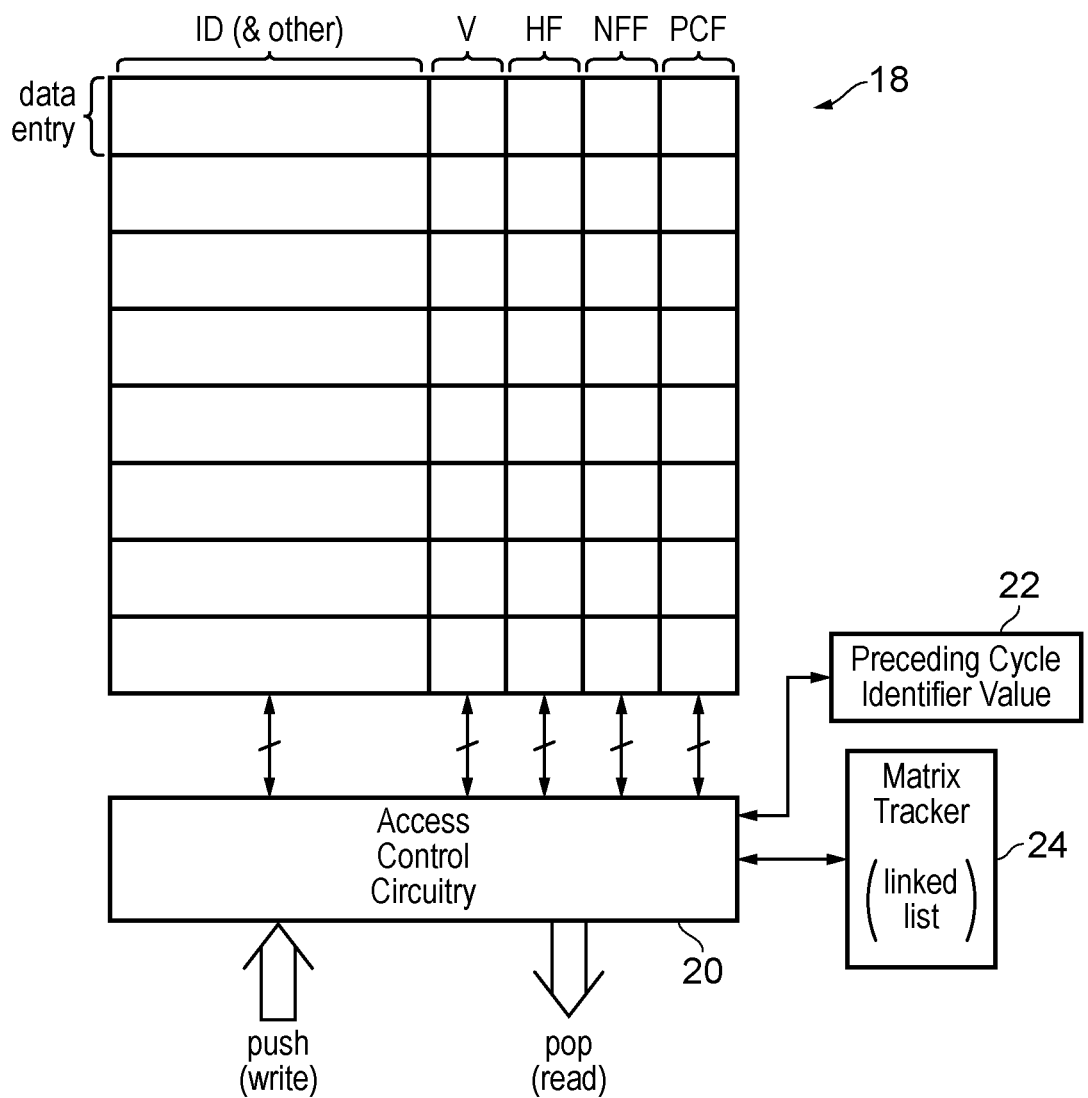
FIG. 2 schematically illustrates data storage circuitry storing one or more ordered sets of data entries and access control circuitry for controlling access to those data entries.

FIG. 2 schematically illustrates data storage circuitry and access control circuitry 20 used to store data entries corresponding to multiple given ordered sets of data entries. In this example, the data storage circuitry 18 stores up to eight data entries. Each data entry includes an identifier ID (specifying a given ordered set of data entries), a valid flag V, a head flag HF (normally corresponding to first data entry to be read from the given ordered set), a next-following flag NFF (normally corresponding to a second data entry to be read from the given ordered set) and a previous cycle flag PCF. In practice, data in addition to the identifier ID may be stored as part of the payload within the data entry, e.g. characteristics of the transaction which is being tracked. The access control circuitry 20 supports both a push (write) operation and a pop (read) operation to be performed in the same processing cycle. Accordingly, the data storage circuitry comprises both a read port and a write port to permit both reading of a data entry from a given ordered set and writing of a data entry to that given ordered set in parallel during a given clock cycle. A register 22 serves to store a preceding cycle identifier value representing the identifier ID of any pop operation performed in an immediately preceding processing cycle to the current given processing cycle. The register 22 is updated each processing cycle and preceding cycle identifier value it stores is used as part of the mechanism for controlling the head flag HF, the next following flag NFF and the preceding cycle flag PCF stored for each data entry in an immediately following processing cycle.

Matrix tracker circuitry 24 in this example embodiment stores matrix data specifying relative ordering of data entries within the ordered sets of data entries. In alternative embodiments, link list circuitry may be used in place of the matrix tracker circuitry 24. In this case link data specifying relative ordering of data entries within the one or more ordered sets of data entries is stored as link list data. In the case of the matrix tracker circuitry 24, this may be used to both identify the oldest data entry and the next-following entry using the matrix data which specifies the relative ordering of the data entries. This matrix data may correspond to a single bit representing the relative ordering of each of the data entries for a given identifier for a corresponding pair of data entries. Such an arrangement permits both the oldest data entry to be identified as well as the next-oldest data entry. The next-oldest data entry may be identified by masking the matrix data corresponding to the oldest data entry, i.e. masking the matrix data corresponding to a head storage location storing the oldest data entry (i.e. the data entry at the head of a first-in-first-out queue) in order to identify a next-following storage location storing the next oldest data entry for that given ordered set of data entries. In the case of link list circuitry, the link data corresponding to the head storage location of the oldest data entry may be followed to identify the next-following storage location.

As previously mentioned each data entry includes, in addition to the identifier value ID which represents the given set of ordered entries to which that data entry belongs, a validity flag V, a head flag HF, a next-following flag NFF and a previous cycle flag PCF in respect of the data entry concerned. The valid flag indicates whether that data entry is currently storing valid data. The head flag HF indicates whether that data entry is currently the oldest data entry stored within the data storage circuitry 18 for a given ordered set of data entries which share an identifier value. The next-following flag NFF indicates whether the data entry concerned is the next oldest (next-following entry) for the given identifier value. The previous-cycle flag PCF indicates whether a data entry having the same identifier value as the data entry concerned was read from the data storage circuitry 18 during an immediately preceding processing cycle.

Using these flags oldest data entry for a given ordered set of data entries stored within the data storage circuitry 18 can be identified in a given processing cycle even when both a read and a write to that given ordered set (i.e. entries that share an identifier ID value) of data entries was made in the preceding processing circle.

Figure 3:
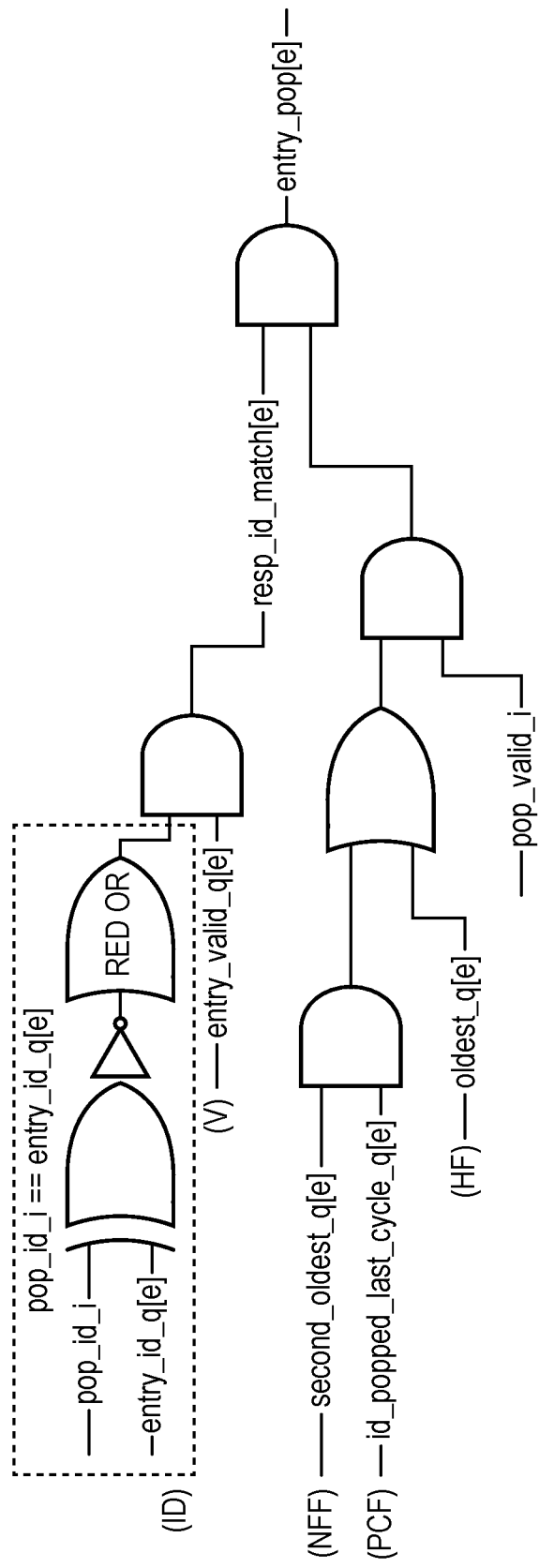
FIG. 3 schematically illustrates circuitry for identifying a data entry to be accessed in dependence upon a head-entry flag, a next-following-entry flag and a preceding-cycle flag.

FIG. 3 schematically illustrates an example logical relationship, and associated example access control circuit implementation, for identifying whether the data entry within a given storage location of the data storage circuitry 18 both matches the identifier to be read and is the oldest such entry within the data storage circuitry 18 which matches that identifier. In particular, for a given data entry (specified by a row_idx value) the logic checks that both the valid flag for that data entry is set indicating that it is storing valid data, and that the identifier value ID stored within that data entry matches the identifier value of the pop (read) operation which is to be performed. In addition to both of these conditions being met, the logical expression (and the corresponding circuitry) determines that the given entry corresponding to the row_idx value concerned is marked using its head flag HF as the oldest entry for the given identifier value, or that it is marked as the second oldest (next-following) entry for the given identifier value being sought and that during the immediately processing cycle an entry with the same identifier value was read from the data storage circuitry as indicated by the previous-cycle flag PCF. In this way, a data entry is identified as one to be read in dependence upon head-entry location data (e.g. the head flag HF), indicating a head storage location within the data storage circuitry 18 storing a head entry of a given ordered set which is the data entry to be accessed next, next-following-entry location data (e.g. the next-following flag NFF), indicating a next-following storage location within the data storage circuitry 18 storing a next-following entry for the given ordered set which is to be accessed next after the head storage location, and preceding-cycle data (e.g. the preceding-cycle flag PCF) indicating whether the head storage location was accessed during a preceding access cycle (i.e. in the preceding access cycle an access was made to a data entry having the same identifier value and accordingly an access will have been made to the data entry which was marked with the head flag during that preceding cycle). In this way, the use of both a head flag and a next-following flag NFF may be used to avoid a requirement to update both of these in the same cycle as data entry marked by a head flag is consumed whilst avoiding a relatively slow lookup within matrix tracker circuitry 24 (or link list circuitry) in order to identify these flags at the same time that they are being consumed. In particular, the preceding-cycle data in the form of the preceding-cycle flag PCF, indicates that a next-following storage location is to be used even though the head flag for a head storage location for the same given ordered set of data entries is present for a different storage location within the data storage circuitry 18 (although marked invalid by this time). A data entry may have its valid flag rapidly/directly changed upon reading so indicate that entry as invalid in the same cycle during which it is read (popped).

Figures 4, 5:
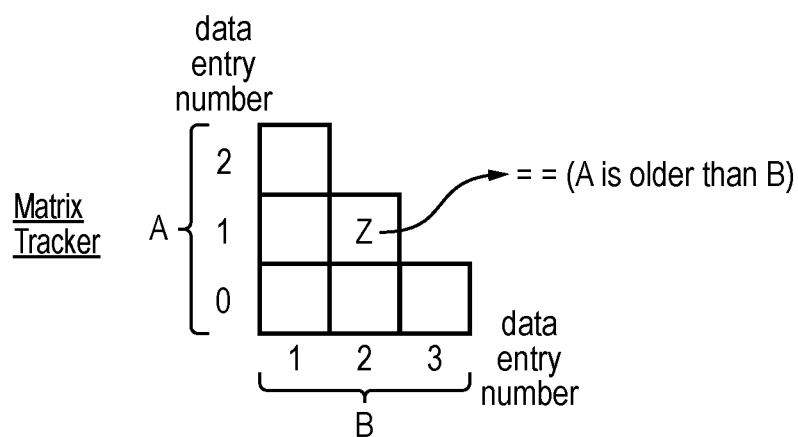
FIG. 4 illustrates an example of data entries and their associated flags stored within data storage circuitry and a related sequence of data accesses.
FIG. 5 schematically illustrates a matrix tracker for storing matrix data specifying relative ordering of data entries.
Figure 6A:
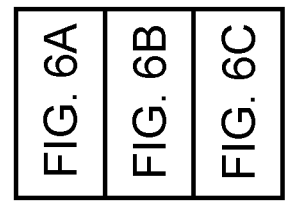
Figure 9B:
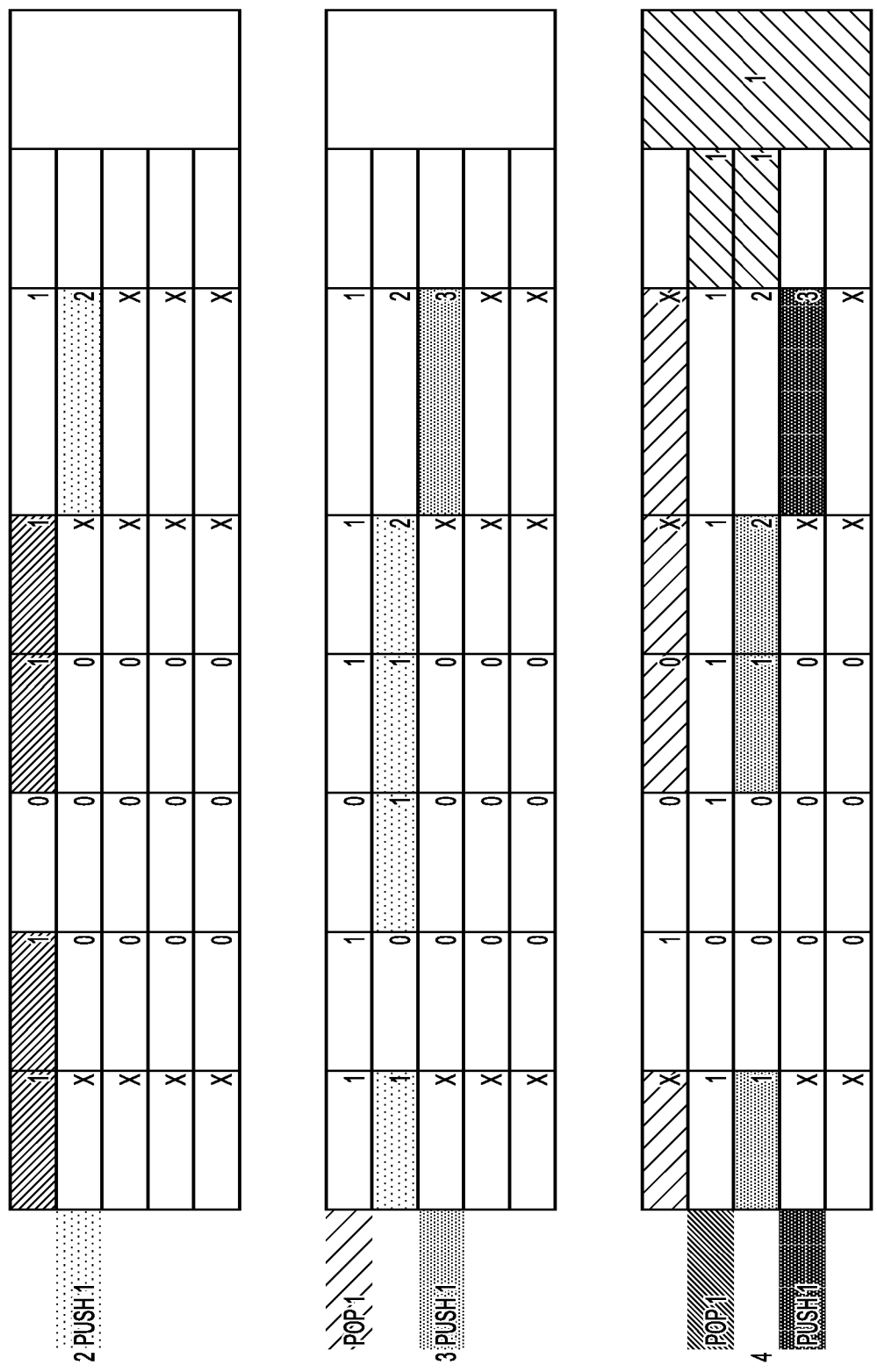
Figure 9C:
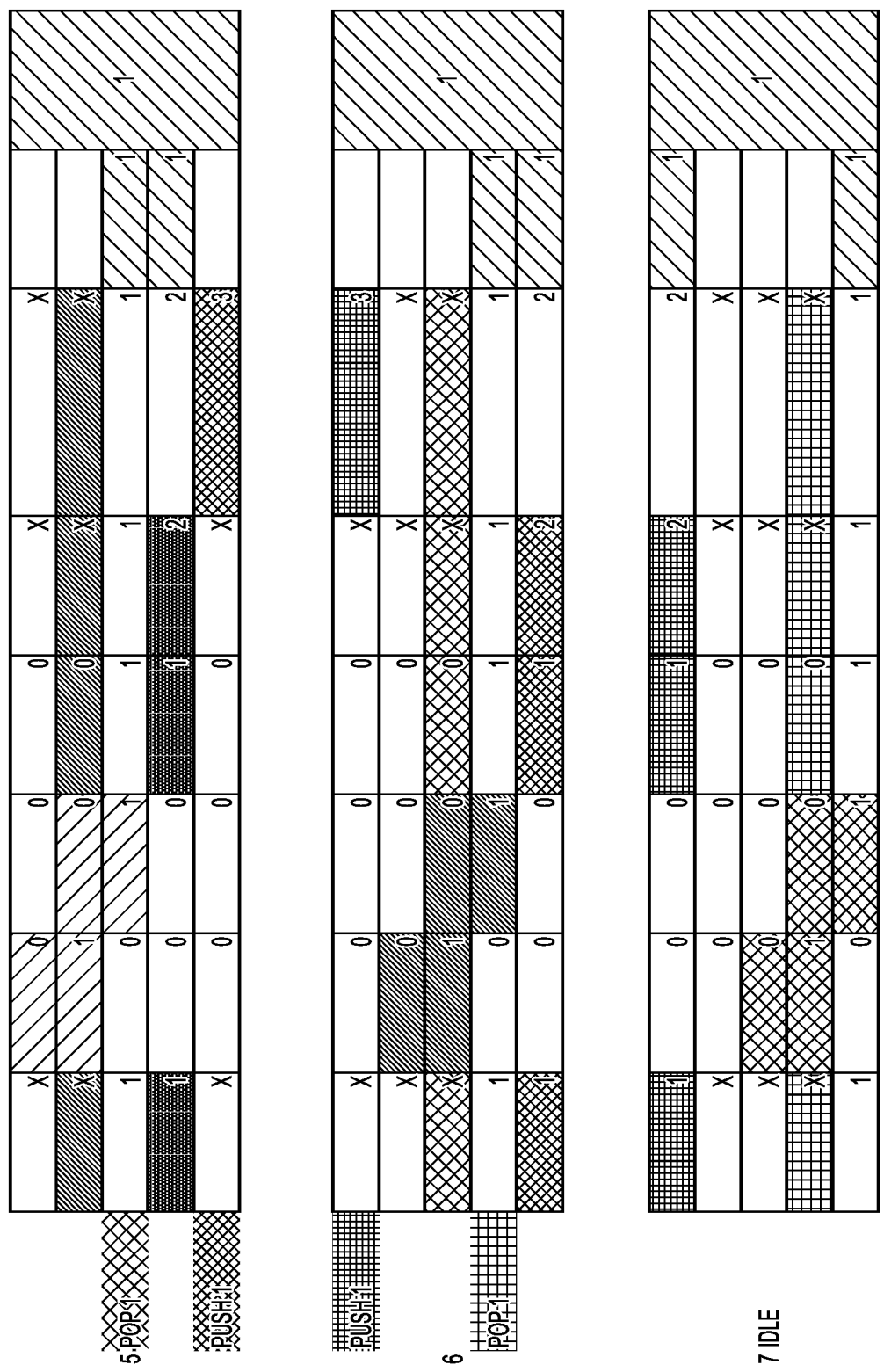
Figure 9F:
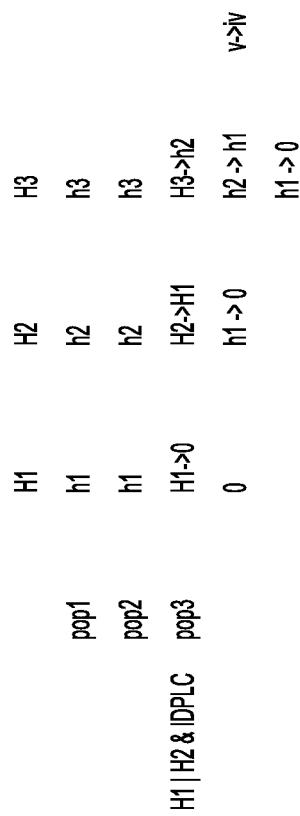
Figure 10A:
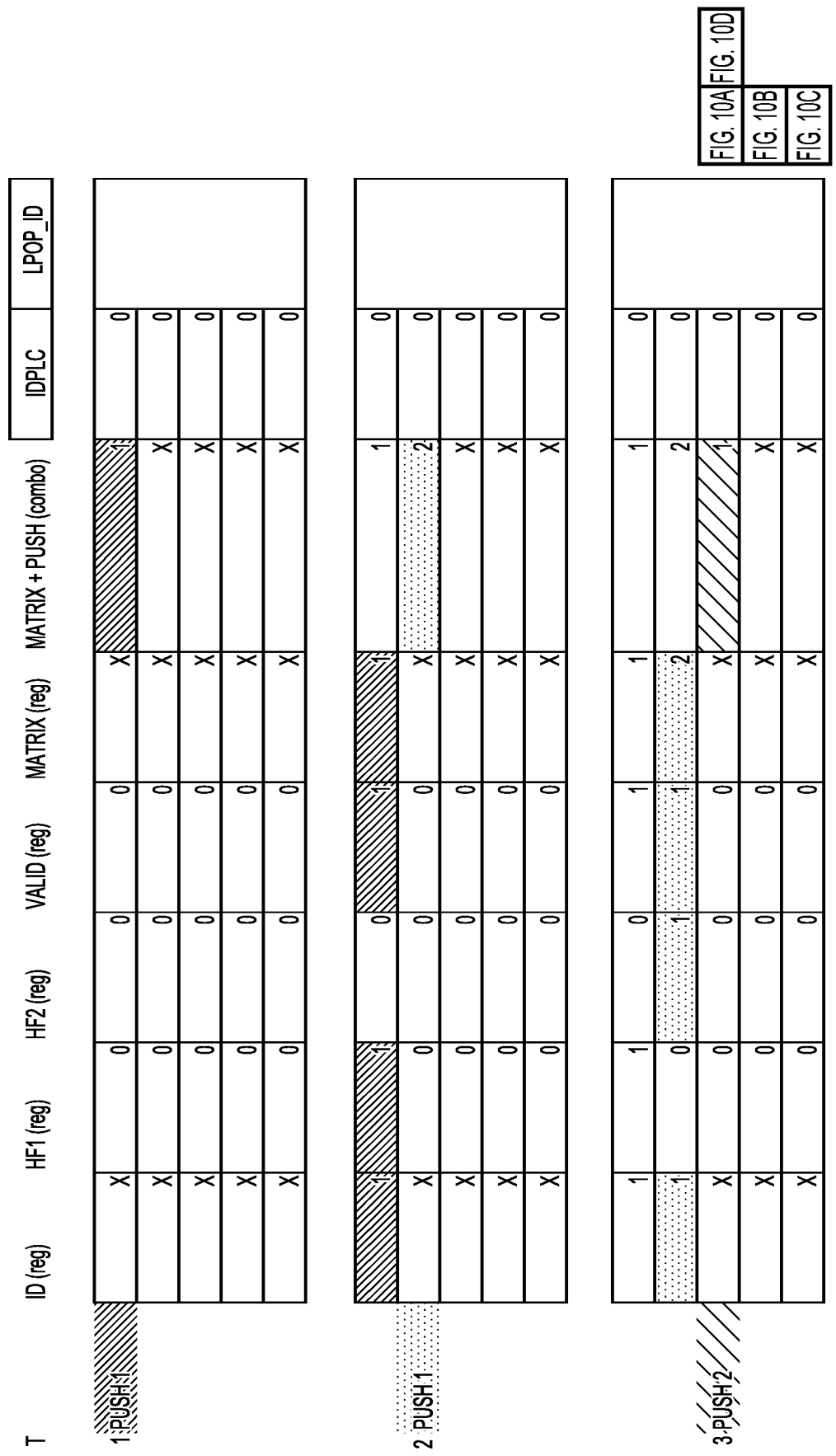
Figure 10B:
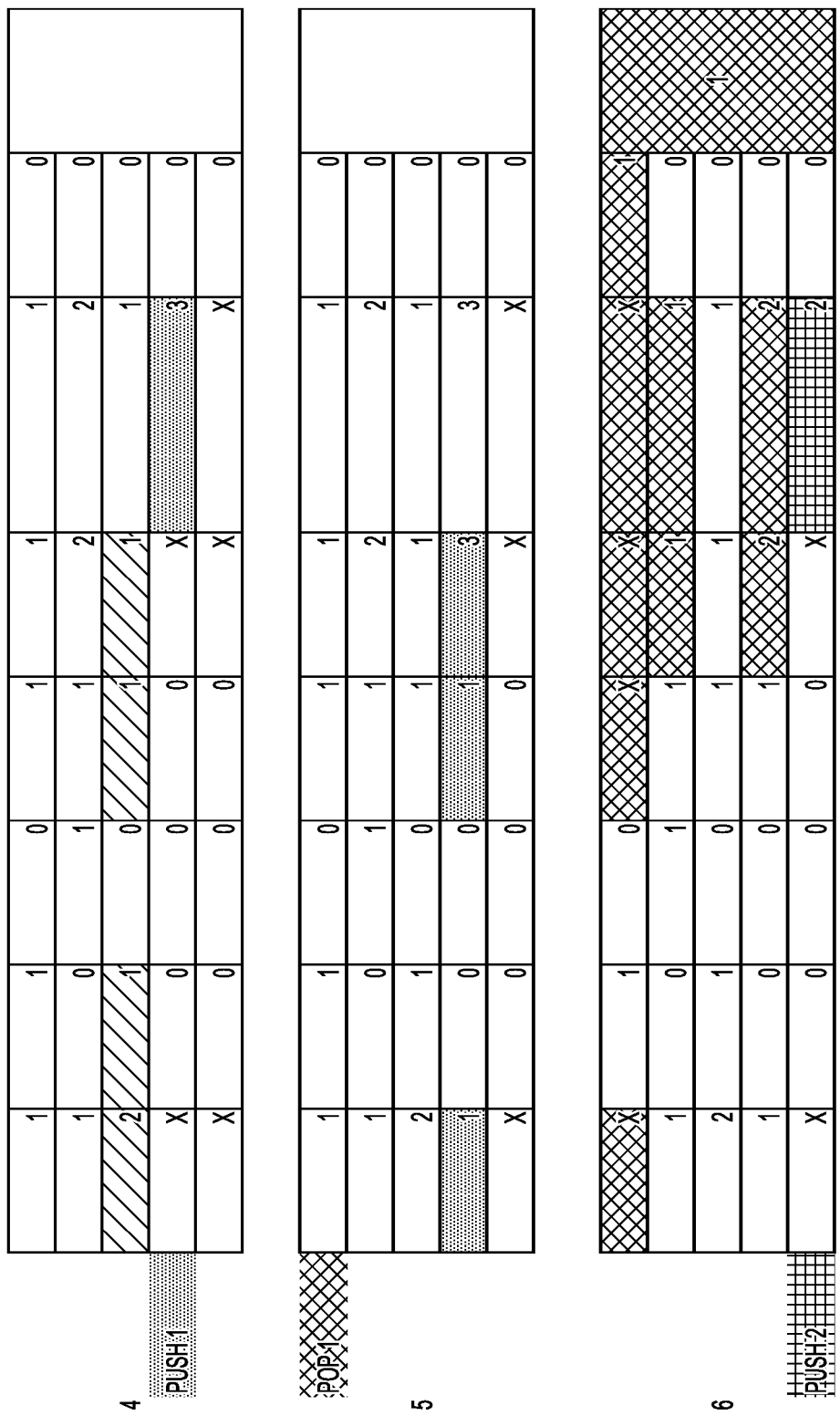

FIG. 4 schematically illustrates data entries stored within four entry data storage circuitry. A push operation, a pop operation and a simultaneous push and pop operation as supported. In the example illustrated, only entries sharing the same identifier value (ID=1) are shown as stored and as being manipulated. It will be appreciated that in practice, the data storage circuitry may simultaneously store data entries corresponding to different identifier values and these may be managed in accordance with their own ordering requirements as a separate given ordered set of data entries.

In state A, the given ordered set comprises a single data entry which is marked as valid and as the head entry using the head flag HF. The preceding cycle flag PCF indicates that a data entry having the same identifier value (i.e. ID=1) was not read in the immediately preceding processing cycle. During the first processing cycle, a write operation to the data storage circuitry 18 is performed to push an additional data entry with the identifier value ID=1 into the data storage circuitry 18. This newly written data entry is also marked as valid and as it is the second oldest data entry for the given ordered set of data entries sharing the identifier value ID=1 it is marked as such using the next-following flag NFF. This is the state illustrated as state B.

The next processing cycle serves to read (pop) the oldest data entry stored within the data storage circuitry 18 matching the identifier value ID=1. This is identified using the head flag HF and the valid flag for that data entry is reset such that in state C the oldest data entry which has just been read is now marked as invalid. The head flag HF value is not reset during the processing cycle in which the pop operation is performed i.e. between states B and C. The preceding-cycle flag is set and the preceding cycle identifier value is set to a value matching the identifier value which was read (popped) during the processing cycle between states B and C.

In state C the oldest data entry corresponding to the data entry which was present in state A is marked with the head flag HF, but is also marked as invalid. The entry which was marked as the next-following entry by the next-following flag NFF in state B is still present within state C, is marked as valid and is also marked with a preceding-cycle flag which indicates that a data entry having the same identifier value ID as was read from the data storage circuitry (and marked as invalid) during the immediately preceding processing cycle.

Between states C and D a simultaneous write (push) and read (pop) of data entries having the same identifier value ID=1 are made to the data storage circuitry. The data entry which is read (popped) is the one which was marked as the next-following entry and valid in state C. It is thus marked as invalid in state D as it has now been read.

The register 22 illustrated in FIG. 2 stores a preceding cycle identifier value which is used by the access control circuitry 20 to maintain both the head flag value and the next-following flag value during the processing cycle between state C and state B. As the data entry which was marked with the head flag in state A is marked with the head flag in state C and is marked as having been read during the previous cycle by the previous-cycle flag PCF, it may be reused for storing a new data entry pushed into the data storage circuitry 18 between state C and state D as during this processing cycle it did not store any valid data value (but was merely available for storing a new value); it is not marked with a preceding-cycle flag value in state D.

The data entry marked "*" in state D corresponds to that which was marked as the next-following entry in state C and was read during the processing cycle between state C and stage D. As the preceding cycle identifier value stored with the register 22 matches the identifier value which was read during the processing cycle between steps C and steps D, and the entry marked "*" was read during that cycle as marked with the next-following flag NF, it is marked in state D as the head value using the head flag HF as it was in the preceding state C treated as the head value even though it was at that time marked as the next-following entry. As the entry marked "*" has already been read, then it is marked as invalid by the valid flag V in state D.

In a processing cycle following state D, the processing cycle identifier value from register 22 may be used in combination with the preceding-cycle flag value for the entry "*" to clear the head flag value HF for that entry by matching against the identifier value ID for that entry and noting that it is marked as invalid.

The combined use of the head flag HF, the next-following flag NFF and the preceding-cycle flag PCF permit maintenance/updating of the head flag HF and the next-following flag NFF to be performed one cycle later than the cycle in which they are consumed thereby easing processing bottlenecks and permitting faster operation.

FIG. 5 schematically illustrates an example of matrix tracker circuitry 24 for tracking the relative ordering of the data entries within a four storage location data storage circuitry embodiment such as that illustrated in FIG. 4. The matrix data stored comprises a single bit which indicates for a given data entry A whether the data entry B is younger, i.e. A is older than B. It will be appreciated that such bits as illustrated in FIG. 5 also give the relationship of whether B is older than A as this is simply the inverse of the bit value stored in the bit locations illustrated in FIG. 5. The bit values along the diagonal axis of the matrix have no meaning as these correspond to whether a given data entry is older or younger than itself, which is not a useful or meaningful piece of information to store.

As an alternative to the matrix tracker of FIG. 5, a linked list using linked list data may be maintained in which a head entry has linked list data pointing to the next-following entry, and the next-following entry has linked list data pointing to the next oldest data entry and so forth.

FIGS. 6 to 10 schematically illustrate operation oft a further example of the present disclosure showing the values and changes of data used to control operation of access control circuitry when controlling access to given ordered sets of data entries. using a matrix tracker implementation. For a given ordered set (sharing an ID value), the HF1 flag corresponds to the head entry data, the HF2 flag corresponds to the next-following-entry data, and the matrix and matrix+ push values correspond to the preceding-cycle data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   data storage circuitry to store one or more ordered sets of data entries;
   access control circuitry to control access, during a given access cycle, to a given ordered set of data entries of said one or more ordered sets of data entries in dependence upon, for said given ordered set:
   head-entry location data indicating a head storage location within said data storage circuitry storing a head entry of said given ordered set to be accessed next;
   next-following-entry location data indicating a next-following storage location within said data storage circuitry storing a next-following entry of said given ordered set to be accessed next after said head storage location for said given ordered set; and
   preceding-cycle data indicating whether said given ordered set was accessed during a preceding access cycle preceding said given access cycle; wherein
   when said preceding-cycle data indicates that said given ordered set was accessed during said preceding access cycle, said access control circuitry uses said next-following-entry location data to access said next-following entry within said next-following storage location during said given access cycle.

2. Apparatus as claimed in claim 1, wherein said head-entry location data comprises a head-entry flag within each data entry of said given ordered set to indicate whether said data entry is said head entry.

3. Apparatus as claimed in claim 1, wherein said next-following-entry location data comprises a next-following-entry flag within each data entry of said given ordered set to indicate whether said data entry is said next-following entry.

4. Apparatus as claimed in claim 1, wherein said data storage circuitry stores a plurality of ordered sets of data entries and each ordered set has respective associated head-entry location data and next-following-entry location data.

5. Apparatus and claimed in claim 1, wherein said preceding-cycle data comprises preceding-cycle flag data associated with each of data entry of said given ordered set to indicate that a data entry of said given ordered set was accessed during said preceding cycle.

6. Apparatus and claimed in claim 1, wherein said preceding-cycle data comprises a register storing an identifier of a given ordered accessed during said preceding cycle.

7. Apparatus as claimed in claim 1, wherein data entries within said given ordered set share a common identifier value and said preceding-cycle data comprises a preceding-cycle identifier value of a data entry accessed within said data storage circuitry using said access control circuitry during said preceding access cycle.

8. Apparatus as claimed in claim 7, wherein said access control circuitry is responsive to said preceding-cycle identifier value to update said head-entry location data, said next-following-entry location data and said preceding-cycle data to correspond to activity in said preceding cycle at least partially in parallel with use of current values of said head-entry location data, said next-following-entry location data and said preceding-cycle data to control access to said given ordered set in said given cycle.

9. Apparatus as claimed in claim 1, wherein said data storage circuitry comprises a read port and a write port and said access control circuitry permits both reading of a data entry from said given ordered set and writing of a data entry to said given ordered set in parallel during said given cycle.

10. Apparatus as claimed in claim 9, wherein, when said previous-cycle said data indicates that said head storage location was accessed during said preceding access cycle, said next-following entry is a last data entry within said given ordered set and said next-following entry is accessed in said given cycle, said access control circuitry writes any new data entry to said given ordered set within said given cycle with new next-following-entry location data to indicate said new data entry to correspond to a new next-following entry.

11. Apparatus as claimed in claim 1, wherein said data storage circuitry and said access control circuitry are within interconnect circuitry to communicate data access transactions within an integrated circuit.

12. Apparatus as claimed in claim 1, wherein said access control circuitry comprises matrix tracker circuitry to store matrix data specifying relative ordering of data entries within said one or more ordered sets of data entries.

13. Apparatus as claimed in claim 12, wherein said matrix tracker masks matrix data corresponding to said head storage location to identify said next-following storage location.

14. Apparatus as claimed in claim 1, wherein said access control circuitry comprises linked list circuitry to store link data specifying relative ordering of data entries within said one or more ordered sets of data entries as linked list data.

15. Apparatus as claimed in claim 14, wherein said linked list circuitry uses link data specifying a link between said head storage location and said next-following storage location to identify said next-following storage location.

16. Apparatus for processing data comprising:
data storage means for storing one or more ordered sets of data entries;
access control means for controlling access, during a given access cycle, to a given ordered set of data entries of said one or more ordered sets of data entries in dependence upon, for said given ordered set:
head-entry location data indicating a head storage location within said data storage means storing a head entry of said given ordered set to be accessed next;
next-following-entry location data indicating a next-following storage location within said data storage means storing a next-following entry of said given ordered set to be accessed next after said head storage location for said given ordered set; and
preceding-cycle data indicating whether said given ordered set was accessed during a preceding access cycle preceding said given access cycle; wherein
when said preceding-cycle data indicates that said given ordered set was accessed during said preceding access cycle, said access control means uses said next-following-entry location data to access said next-following entry within said next-following storage location during said given access cycle.

17. A method of processing data comprising:
storing one or more ordered sets of data entries within data storage circuitry;
controlling access, during a given access cycle, to a given ordered set of data entries of said one or more ordered sets of data entries in dependence upon, for said given ordered set:
head-entry location data indicating a head storage location within said data storage circuitry storing a head entry of said given ordered set to be accessed next;
next-following-entry location data indicating a next-following storage location within said data storage circuitry storing a next-following entry of said given ordered set to be accessed next after said head storage location for said given ordered set; and
preceding-cycle data indicating whether said given ordered set was accessed during a preceding access cycle preceding said given access cycle; wherein
when said preceding-cycle data indicates that said given ordered set was accessed during said preceding access cycle, using said next-following-entry location data to access said next-following entry within said next-following storage location during said given access cycle.

* * * * *